US008084128B2

(12) United States Patent
Komuro et al.

(10) Patent No.: US 8,084,128 B2
(45) Date of Patent: *Dec. 27, 2011

(54) RARE-EARTH MAGNET AND MANUFACTURING METHOD THEREOF AND MAGNET MOTOR

(75) Inventors: Matahiro Komuro, Hitachi (JP); Yuichi Satsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,402

(22) Filed: Dec. 9, 2010

(65) Prior Publication Data

US 2011/0079327 A1 Apr. 7, 2011

Related U.S. Application Data

(63) Continuation of application No. 12/534,530, filed on Aug. 3, 2009, now Pat. No. 7,871,475, which is a continuation of application No. 11/652,617, filed on Jan. 12, 2007, now Pat. No. 7,569,114, which is a continuation of application No. 11/157,816, filed on Jun. 22, 2005, now Pat. No. 7,179,340.

(30) Foreign Application Priority Data

Jun. 25, 2004 (JP) ................................ 2004-187178
Jul. 28, 2004 (JP) ................................ 2004-219492
Nov. 22, 2004 (JP) ................................ 2004-336847

(51) Int. Cl.
*B32B 5/16* (2006.01)
*H01F 1/057* (2006.01)

(52) U.S. Cl. ........................................ 428/403; 148/302

(58) Field of Classification Search ........................ None
See application file for complete search history.

(56) References Cited

U.S. PATENT DOCUMENTS 4,747,924 A 5/1988 Itoh et al.
(Continued)

FOREIGN PATENT DOCUMENTS

CN 1234589 11/1999
(Continued)

OTHER PUBLICATIONS

Chinese Official Action issued on Mar. 16, 2007, for CN 200510079130X.

(Continued)

*Primary Examiner* — John Sheehan
(74) *Attorney, Agent, or Firm* — Antonelli, Terry, Stout & Kraus, LLP.

(57) ABSTRACT

The object of the present invention is to provide a rare earth magnet which enables to achieve a good balance between high coercive force and high residual magnetic flux density, and its manufacturing method. The present invention provides a rare earth magnet in which a layered grain boundary phase is formed on a surface or a portion of a grain boundary of $Nd_2Fe_{14}B$ which is a main phase of an R—Fe—B (R is a rare-earth element) based magnet, and wherein the grain boundary phase contains a fluoride compound, and wherein a thickness of the fluoride compound is 10 μm or less, or a thickness of the fluoride compound is from 0.1 μm to 10 μm, and wherein the coverage of the fluoride compound over a main phase particle is 50% or more on average. Moreover, after layering fluoride compound powder, which is formed in plate-like shape, in the grain boundary phase, the rare earth magnet is manufactured by quenching the layered compound after melting it at a vacuum atmosphere at a predetermined temperature, or by heating and pressing the main phase and the fluoride compound to make the fluoride compound into a layered fluoride compound along the grain boundary phase.

6 Claims, 6 Drawing Sheets

U.S. PATENT DOCUMENTS

| | | | |
|---|---|---|---|
| 5,411,603 | A | 5/1995 | Vial et al. |
| 5,858,124 | A | 1/1999 | Endo et al. |
| 6,511,552 | B1 | 1/2003 | Makita et al. |
| 6,960,240 | B2 | 11/2005 | Hirota et al. |
| 7,179,340 | B2 | 2/2007 | Komuro et al. |
| 7,569,114 | B2 | 8/2009 | Komuro et al. |
| 2003/0106615 | A1 | 6/2003 | Hirota et al. |
| 2005/0081959 | A1 | 4/2005 | Kim et al. |

FOREIGN PATENT DOCUMENTS

| | | |
|---|---|---|
| JP | 61-195954 | 8/1986 |
| JP | 06-231925 | 8/1994 |
| JP | 10-163055 | 6/1998 |
| JP | 2000-34502 | 2/2000 |
| JP | 2000-34503 | 2/2000 |
| JP | 2003-282312 | 10/2003 |
| WO | WO 2005/123974 | 12/2005 |

OTHER PUBLICATIONS

Chinese Official Action issued on Nov. 30, 2007, for CN 200510079130X.

Machine Translation of Japanese Patent Document No. 2003-282312.

Japanese Official Action mailed Oct. 6, 2009, for Application No. 2004-336847.

RARE-EARTH MAGNET AND MANUFACTURING METHOD THEREOF AND MAGNET MOTOR

This application is a Continuation application of application Ser. No. 12/534,530, filed Aug. 3, 2009 now U.S. Pat. No. 7,871,475, which is a Continuation application of application Ser. No. 11/652,617, filed Jan. 12, 2007 now U.S. Pat. No. 7,569,114, which is a Continuation application of application Ser. No. 11/157,816, filed Jun. 22, 2005 now U.S. Pat. No. 7,179,340, the contents of which are incorporated herein by reference in their entirety.

FIELD OF THE INVENTION

The present invention relates to a rare-earth magnet and its manufacturing method, more particularly, relates to a rare-earth magnet having increased coercive force and high energy product and its manufacturing method, and further relates to a magnetic motor using the rare-earth magnet as a rotor.

BACKGROUND OF THE INVENTION

Conventional rare earth magnets including fluoride compounds are described, for example, in JP-A-2003-282312. In the technology described in JP-A-2003-282312, the grain boundary phase has a granular fluoride compound, and the size of the grain of the grain boundary phase is several μm. In such a rare earth magnet, if the coercive force is enhanced, the energy product decreases significantly.

Patent literature 1: JP-A-2003-282312

In the patent literature 1, the magnetic properties of a sintered magnet produced by adding NdFeB powder for sintered magnet and $DyF_3$ that is a fluoride compound is described in table 3. Value of a residual magnetic flux density (Br) is 11.9 kG when $DyF_3$ is added by 5 wt %. The value is decreased by about 9.8% as compared to a value (13.2 kG) of the case of no addition thereof. The energy product ((BH) max) also decreases significantly due to the decrease of the residual magnetic flux density. Therefore, though the coercive force is increased, it is difficult to use the magnet for a magnetic circuit requiring high magnetic flux or a rotating machine requiring high torque due to the small energy product.

In the patent literature 1, as for $NdF_3$, it is used by mixing $NdF_3$ powder having a mean particle diameter of 0.2 μm and NdFeB alloy powder using an automatic mortar, but there is no description in relation to the shape of the fluoride, and after sintering it is aggregated.

BRIEF SUMMARY OF THE INVENTION

The present invention is performed in view of above, and its object is to provide a rare earth magnet which enables to a good balance between high coercive force and high residual magnetic flux density, and its manufacturing method.

Also, the object of the present invention is to provide a magnetic motor using the rare earth magnet as a rotor of the magnet motors.

Other objects, features and advantages of the invention will become apparent from the following description of the embodiments of the invention taken in conjunction with the accompanying drawings.

DESCRIPTION OF REFERENCE NUMERALS

Figure 1:
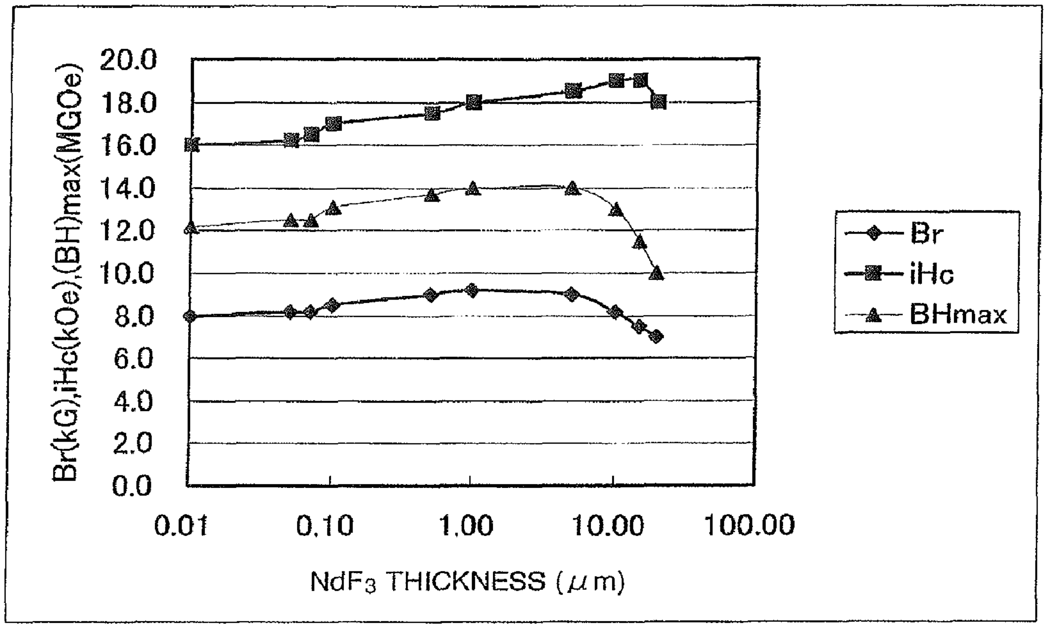
FIG. 1 is a view illustrating the relationship between the magnetic properties of an NdFeB—$NdF_3$ magnet and the $NdF_3$ thickness.

101 . . . inert gas atmosphere, 102 . . . fluoride compound (raw material powder), 103 . . . tungsten electrode, 104 . . . nozzle hole, 105 . . . roll (rotates in an arrow direction), 107 . . . shutter, 201 . . . a magnet including a fluoride compound, 202 . . . shaft

DETAILED DESCRIPTION OF THE INVENTION

To achieve the above objects, the present invention intends to increase an interface between a fluoride compound and a main phase by forming a layered fluoride compound in a grain boundary, to thin the thickness of the fluoride compound, or to make the fluoride compound in a ferromagnetic phase.

In order to layer the shape of the fluoride compound powder after forming a magnet, the present invention also makes the particle shape of the fluoride compound powder to be used be plate-like. One example of such an approach is to melt and quench the fluoride compound to make it be plate-like. After being molten in a vacuum at a melting temperature of about 2000° C., it is quenched at a quench temperature of $10^{5}$° C./sec. By quenching, it is possible to obtain plate-like powder having a thickness of 10 μm or less and an aspect ratio of 2 or more. Besides using such plate-like powder, an approach of heating and pressing the main phase and the fluoride compound to mold them such that the fluoride compound layers along the grain boundary, is also possible. If the fluoride compound is layered after molding, the area of the interface between the fluoride compound and the main phase is increased than that of the case that the fluoride compound is aggregated or granulated, and the area is formed along the grain boundary after molding. Since the fluoride is layered, even if less amount of the fluoride is mixed than that of it is aggregated, the increase of magnetic properties due to fluoride is achieved. For converting the fluoride compound into a ferromagnetic material, Fe or Co is added to the fluoride compound, and powder or thin strips are formed through a quenching process. A fluoride compound is paramagnetic and its magnetization at room temperature is small. Thereby, when fluoride compound is mixed with the main phase, the residual magnetic flux density decreases substantially in proportion to the mixing amount. The decrease of the residual magnetic flux density causes significant decrease of the energy product. Accordingly, in a magnetic circuit in which the magnetic flux density of a magnet is designed to be higher, though it was difficult to form a magnet including a conventional fluoride compound, when the fluoride compound could be converted into a ferromagnetic material, even if the added amount of the fluoride compound is equal to that of the conventional one, it is possible to increase the values of the saturated magnetic flux density and the residual magnetic flux density by adding the ferromagnetic fluoride compound. Even when the fluoride compound exhibits ferromagnetism, if the coercive force of the fluoride compound itself becomes not higher, the coercive force or the squareness property of the main phase is adversely affected. In order to ensure the squareness property and enhance the residual magnetic flux density while maintaining the coercive force of the main phase, the coercive force of the fluoride compound should be enhanced. It is possible to ensure the coercive force of the main phase or the squareness property to reduce the decrease of the residual magnetic flux density by making the coercive force of the fluoride compound itself 1 kOe or more. For forming the fluoride compound having such coercive force, an approach of melting and quenching the fluoride compound and the ferromagnetic, is applied. For quenching, a single-roll process or a twin-roll process may be used.

Now referring to drawings, embodiments according to the present invention will be described.

EXAMPLE 1

Figure 7:
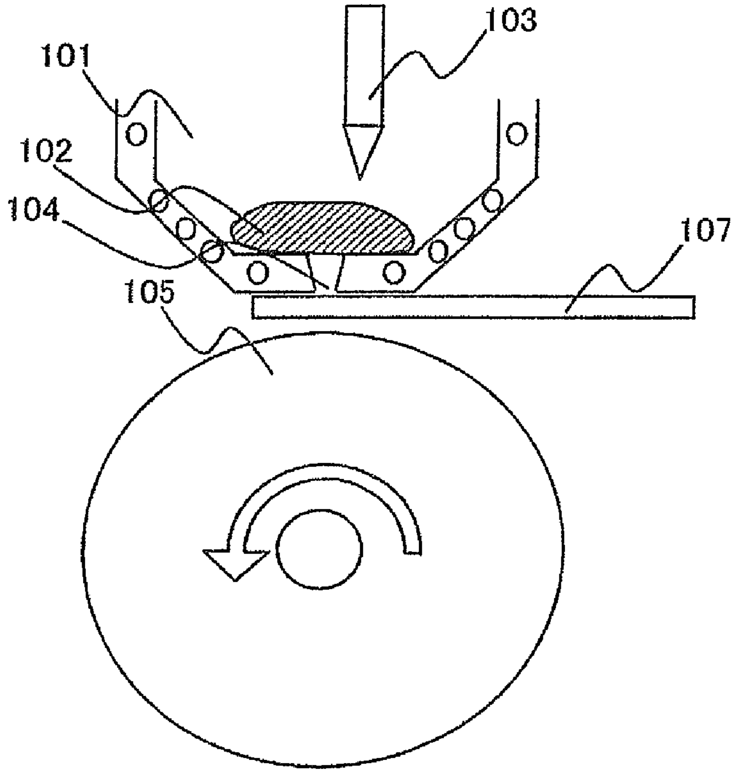
FIG. 7 is a view illustrating a quenching apparatus for forming fluoride compound powder.

NdFeB alloy used was a powder having a particle size of about 100 μm subjected to a hydrogenation/dehydrogenation treatment, and the coercive force of this powder was 16 kOe. The fluoride compound to be mixed with the NdFeB powder was $NdF_3$. $NdF_3$ raw material powder was quenched using a quenching apparatus such as in FIG. 7 to form plate-like or ribbon-like powder. As shown in FIG. 7, raw material 102 was molten in an inert gas atmosphere 101 by arc melting using tungsten electrode 103, and by opening a shutter 107 of a nozzle hole 104, the molten $NdF_3$ was atomized on a roll 105 from the nozzle hole 104. Ar gas was used as inert gas, and Cu or Fe based material was used for the roll 105, and the molten $NdF_3$ was atomized on the roll 105 rotating at 500 to 5000 rpm by pressurizing it with Ar gas and utilizing the differential pressure. The resulting $NdF_3$ powder was plate-like, and the $NdF_3$ powder and NdFeB powder were mixed together such that $NdF_3$ content became about 10 wt %. The mixed powder was oriented and compressed by a magnetic field of 10 kOe, and thermally compression molded in an Ar gas atmosphere. Under the molding condition of heating temperature at 700° C. and compression pressure of 3 to 5 t/cm$^2$, an anisotropic magnet of 7 mm×7 mm×5 mm was made. The densities of the compacts made above were all 7.4 g/cm$^3$ or more. Demagnetization curve of the molded anisotropic magnet was measured at 20° C. by applying a pulse magnetic field of 30 kOe or more in the anisotropic direction thereof.

The result is shown in FIG. 1. The $NdF_3$ thickness is an average thickness of an $NdF_3$ layer in the grain boundary of main phase of $Nd_2Fe_{14}B$ grains. The $NdF_3$ thickness is depends on molding condition and thermal compression molding condition of $NdF_3$ powder, and the shape of NdFeB powder. As shown in FIG. 1, during making the $NdF_3$ powder, the speed of revolution of a roll is changed from 500 to 5000 rpm to change the $NdF_3$ thickness, the pulverized powder is further classified using such as a mesh. The higher of the speed of revolution, and the larger the pressure of compression molding, the thinner $NdF_3$ thickness may be obtained. As shown in FIG. 1, as the $NdF_3$ thickness increases from 0.01 μm, the values of Br (residual magnetic flux density), iHc (coercive force), and Bhmax (energy product) tend to increase. In the range of the $NdF_3$ thickness of from 0.1 to 10 μm, the iHc increases significantly and Br also increases. Though the coercive force increases due to the presence of $NdF_3$ in an interface, the reason of its decrease when the thickness is increased, is concluded that the ferromagnetic bonding between grains is weakened due to the $NdF_3$ being paramagnetic. The reason of the increase of Br is due to the magnetic flux density at a low magnetic field being increased.

Figure 2:
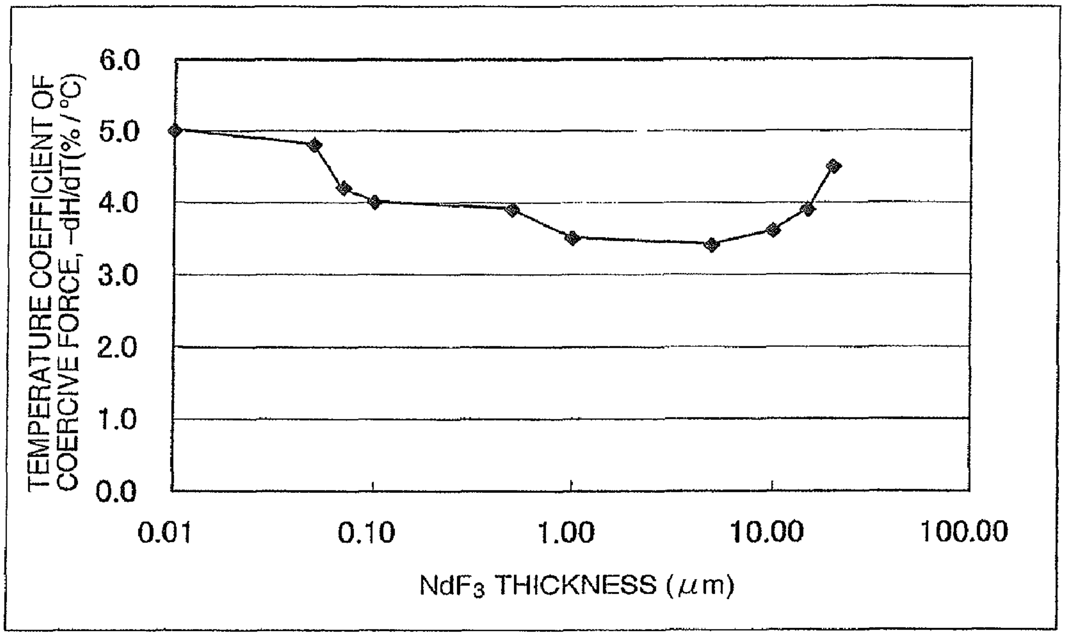
FIG. 2 is a view illustrating the temperature coefficient of the coercive force of an NdFeB—$NdF_3$ magnet.
Figure 10:
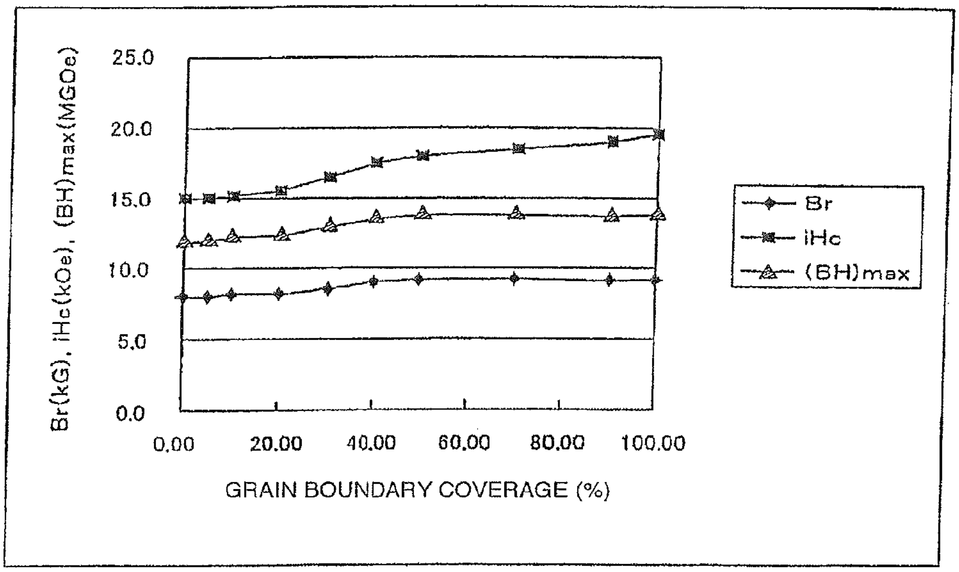
FIG. 10 is a view illustrating the relationship between the magnetic properties of an NdFeB—$NdF_3$ magnet and the grain boundary coverage of $NdF_3$.

In FIG. 2, the result of the temperature dependence of the coercive force of a magnet having the $NdF_3$ thickness of 1.0 μm, which is measured while the magnet being heated in the atmosphere, is shown. When the magnet is added with no $NdF_3$, the temperature coefficient of its coercive force is 5.0%/° C. The temperature coefficient of the coercive force becomes smaller by increasing the $NdF_3$ thickness. The effective range of the $NdF_3$ thickness is from 1 nm to 10000 nm, and the temperature coefficient of the coercive force is 3.4%/° C. at minimum. It is concluded that this relates to the fact that $NdF_3$ prevents the main phase from being oxidized and to the stabilization of the magnetic domain due to being high coercive force. FIG. 1 shows results in which the average coverage of fluoride over the main phase is about 50%; however, when the $NdF_3$ thickness is from 0.1 to 10 μm, if the coverage changes, their coverage dependences are shown in FIG. 10. The coverage relates to the parameters and conditions such as mixing condition and particle size of the fluoride powder, particle size of the NdFeB powder, shape of the NdFeB powder, an orienting magnetic field, pressure during orientation, and heating condition. As the coverage increases, the coercive force tends to increase.

EXAMPLE 2

The NdFeB powder used in the example was intended for use of a bonded magnet or the like. The NdFeB powder used in the example 2 was powder of particle size of 5 μm diameter for use of sintering, in which main phase was $Nd_2Fe_{14}B$, and the grain boundary of the main phase was made of grown Nd rich phase. After being vacuumed to a degree of $1\times10^{-5}$ Torr or less, $(Nd,Dy)F_3$ powder was molten in an Ar atmosphere using arc melting, then the molten metal was pressurized and atomized on a surface of a single roll rotating in a vacuum atmosphere. The cooling rate of this processing was $10^4$ to $10^{6}$° C./sec. The $NdF_3$-5 wt % $DyF_3$ powder (i.e. (Nd,Dy) $F_3$ powder) formed by quenching, included powder having thickness of 10 μm or less and aspect ratio (the ration of vertical length and horizontal length) of 2 or more. By removing thick powder from such $(Nd,Dy)F_3$ powder, $NdF_3$ powder being as possible as thin was selected to be mixed with Nd—Fe—B alloy powder. The mixing amount of the (Nd, Dy)$F_3$ powder was about 10 wt %. The mixed powder was pressed (1 t/cm$^2$) in a magnetic field (10 kOe) and sintered at 1100° C. in a vacuum atmosphere. The sintered body was 10×10×5 mm, the anisotropic direction was the direction of 5 mm. After being magnetized in the anisotropic direction in a magnetic field of 30 kOe, the sintered magnet was measured its demagnetization curve at 20° C. The average grain boundary coverage was about 50%.

Figure 3:
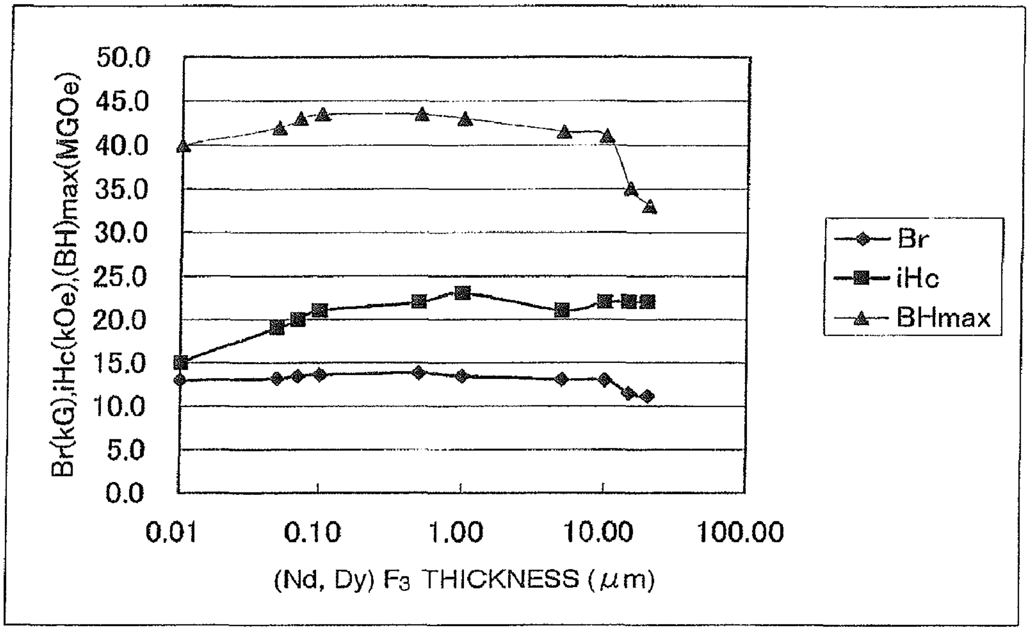
FIG. 3 is a view illustrating the relationship between the magnetic properties of an NdFeB-$(Nd,Dy)F_3$ magnet and the $NdF_3$ thickness.

The results are shown in FIG. 3. The relationships between the magnetic properties and the $NdF_3$ thickness are qualitatively equal to those of the tendency of FIG. 1. Thus, Br, iHc, and Bhmax are all higher than those of a magnet without $NdF_3$ in a range of the thickness of $(Nd,Dy)F_3$ from 0.1 μm to 10 μm. This indicates that $(Nd,Dy)F_3$ allows to make coercive force more higher and to increase the squareness property of the demagnetization curve and Br, resulting in the increase of (BH)max. From these results, it is possible to attain the high performance of the sintered magnet by controlling the grain boundary coverage and its fluoride thickness.

EXAMPLE 3

The NdFeB alloy was hydride dehydrated powder having a particle size of 150 μm, and the coercive force of the powder was 12 kOe. The fluoride compound added to the NdFeB powder was $NdF_3$. The raw material powder of $NdF_3$ was pulverized into powder having a mean particle diameter of 0.1 μm. It was mixed with the NdFeB powder such that the content of $NdF_3$ became to 10%. The mixed powder was oriented and compressed using a magnetic field of 10 kOe, and thermally compression molded in a vacuum atmosphere ($1\times10^{-5}$ Torr) by energization. Under the molding condition of heating temperature at 700° C. and compression pressure of 3 t/cm$^2$, an anisotropic magnet of 7 mm×7 mm×5 mm was made. The densities of the compacts made above were all 7.4 g/cm$^3$ or more. Demagnetization curve of the molded anisotropic magnet was measured at 20° C. by applying a pulse magnetic field of 30 kOe or more in the anisotropic direction thereof.

Figure 4:
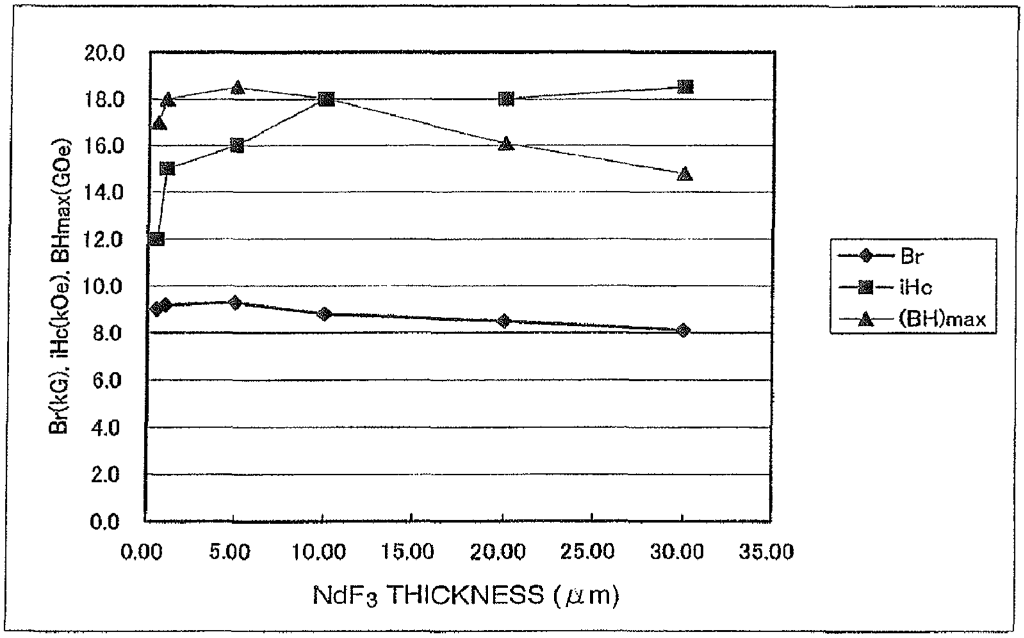
FIG. 4 is a view illustrating the relationship between the magnetic properties of an NdFeB—$NdF_3$ magnet and the $NdF_3$ thickness.
Figure 5:
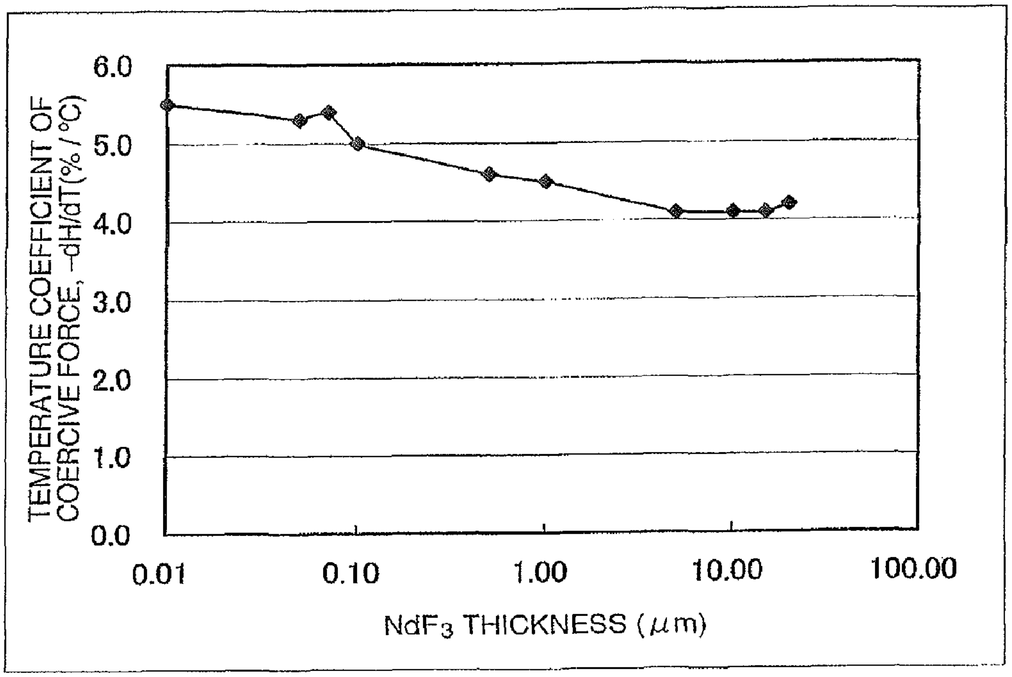
FIG. 5 is a view illustrating the temperature coefficient of the coercive force of an NdFeB—$NdF_3$ magnet.
Figure 9:
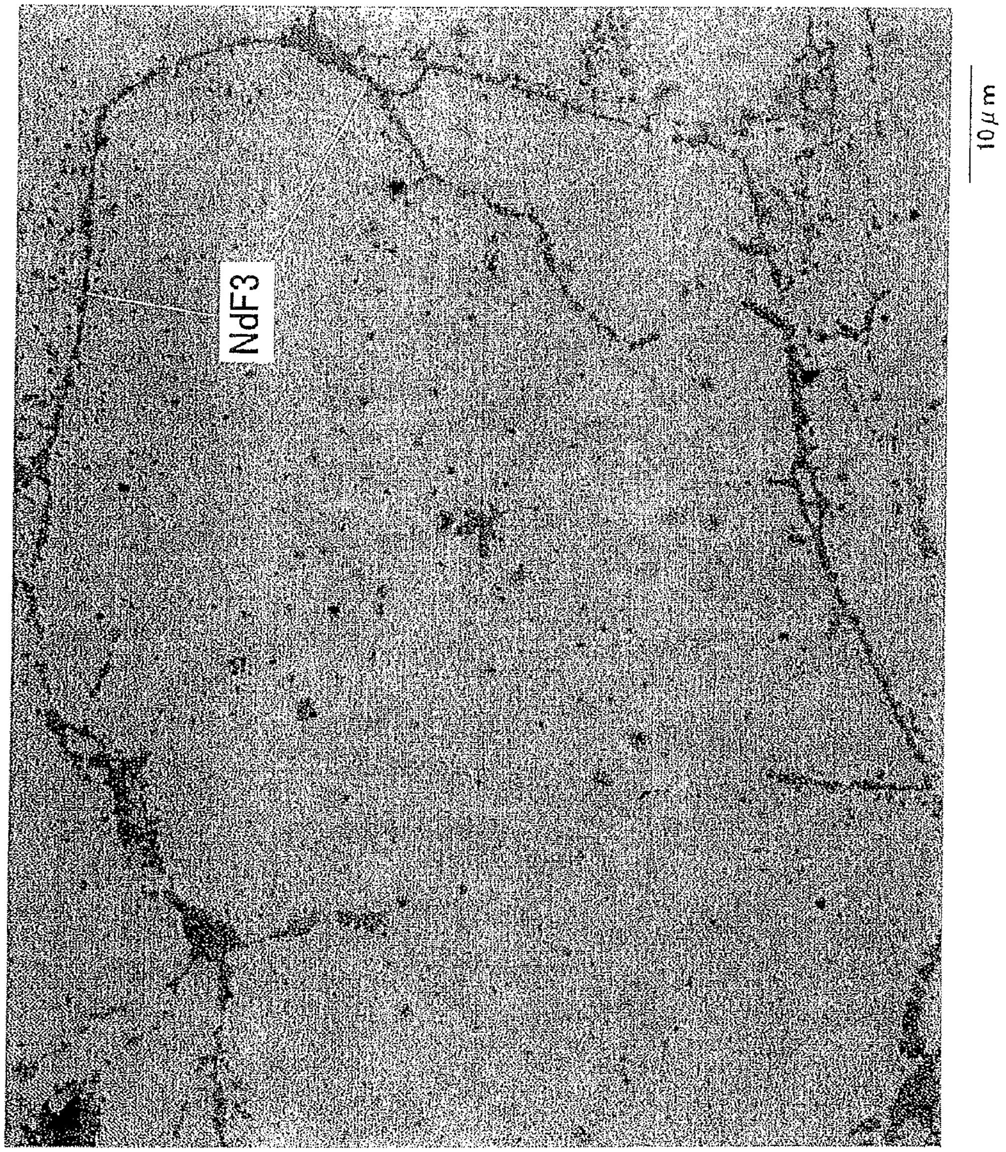
FIG. 9 is a view illustrating a sectional texture of a magnet including a fluoride compound.

The results are shown in FIG. 4. The $NdF_3$ thickness is the average thickness of an $NdF_3$ layer in the grain boundary of main phase of $Nd_2Fe_{14}B$ grains. The $NdF_3$ thickness is depends on pulverizing condition and thermal compression molding condition of $NdF_3$ powder. As shown in FIG. 4, Br, iHc, and Bhmax are all higher than those of a magnet without $NdF_3$ in a range of the thickness of $(Nd,Dy)F_3$ from 0.1 μm to 10 μm. iHc significantly increases at the $NdF_3$ thickness of 1 μm or more, and Br also keeps the value being equal to or higher than that of a magnet without $NdF_3$ in the thickness range of $NdF_3$ from 1 μm to 10 μm. The texture of the cross section of the magnet when the $NdF_3$ thickness is 1 μm is shown in FIG. 9. Analysis of the SEM results in allowing the $NdF_3$ thickness to be identified, it is found that the $NdF_3$ is formed with coverage of 50% or more along the grain boundary of the main phase. The result of the temperature coefficient of the coercive force of the magnet in FIG. 4, which is heated in the atmosphere and measured, is shown in FIG. 5. The temperature coefficient of the coercive force decreases by increasing the $NdF_3$ thickness. It is concluded that, similarly to the case in FIG. 2, this relates to the fact that $NdF_3$ prevents the main phase from being oxidized and to the stabilization of the magnetic domain due to being high coercive force.

EXAMPLE 4

Figure 6:
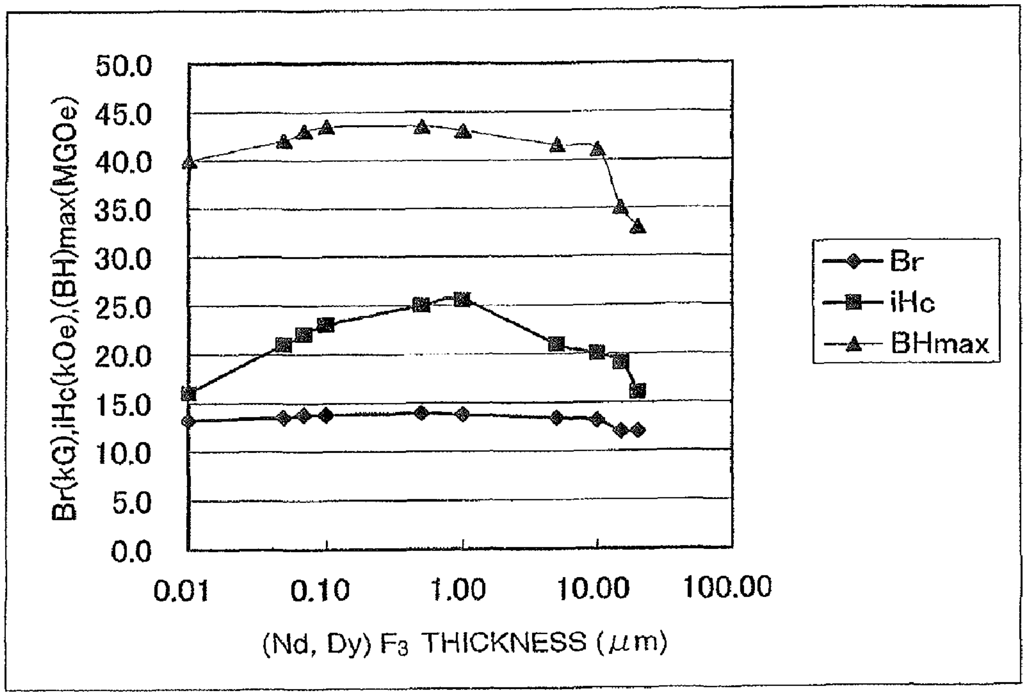
FIG. 6 is a view illustrating the relationship between the magnetic properties of an NdFeB-$(Nd,Dy)F_3$ magnet and the $NdF_3$ thickness.

NdFeB powder was a powder for use of sintering, and the particle size of main phase $Nd_2Fe_{14}B$ powder was 5 μm. After being vacuumed to a degree of $1\times10^{-2}$ Torr or less, the mixed powder of $(Nd,Dy)F_3$ and Fe was heated and quenched and formed by rolling using a twin roll in an Ar atmosphere. The cooling rate was $10^{3}$° C./sec at that time. The $NdF_3$-5 wt % $DyF_3$-Fe 1 wt % powder (Fe—$(Nd,Dy)F_3$ powder) formed by quenching includes powder having a thickness of 30 μm or less, and an aspect ratio (the ration of vertical length and horizontal length) of 2 or more. Such Fe—$(Nd,Dy)F_3$ powder was mixed with Nd—Fe—B powder. The Fe—$(Nd,Dy)F_3$ powder exhibited ferromagnetism at room temperature, because it contained Fe. Its Curie temperature was 400° C. and was higher than that of the NdFeB main phase. Moreover, the coercive force of Fe—$(Nd,Dy)F_3$ powder at 20° C. was 3 to 10 kOe, and higher coercive force than that of using fluoride without Fe could be obtained. The mixing amount of Fe—$(Nd,Dy)F_3$ was 10 wt %. The mixed powder was pressed (1 t/cm$^2$) in a magnetic field (10 kOe) and sintered at 1100° C. in a vacuum atmosphere. The sintered body was 10×10×5 mm, the anisotropic direction was the direction of 5 mm. After being magnetized in the anisotropic direction in a magnetic field of 30 kOe, the sintered magnet was measured its demagnetization curve at 20° C. The average grain boundary coverage was about 50%. The results are shown in FIG. 6. The relationships between Br and Bhmax in FIG. 6 and the $NdF_3$ thickness are qualitatively equal to those of the tendency of FIG. 3. Br, iHc, and Bhmax are all higher than those of a magnet without $NdF_3$ in a range of the thickness of $(Nd,Dy)F_3$ of from 0.05 μm to 10 μm. This indicates that $(Nd,Dy)F_3$ allows making coercive force more higher and increases the squareness property of the demagnetization curve and Br resulting in the increase of (BH)max. From these results, it is possible to attain the high performance of the sintered magnet by controlling the grain boundary coverage (50% or more) and its fluoride thickness.

EXAMPLE 5

Figure 8:
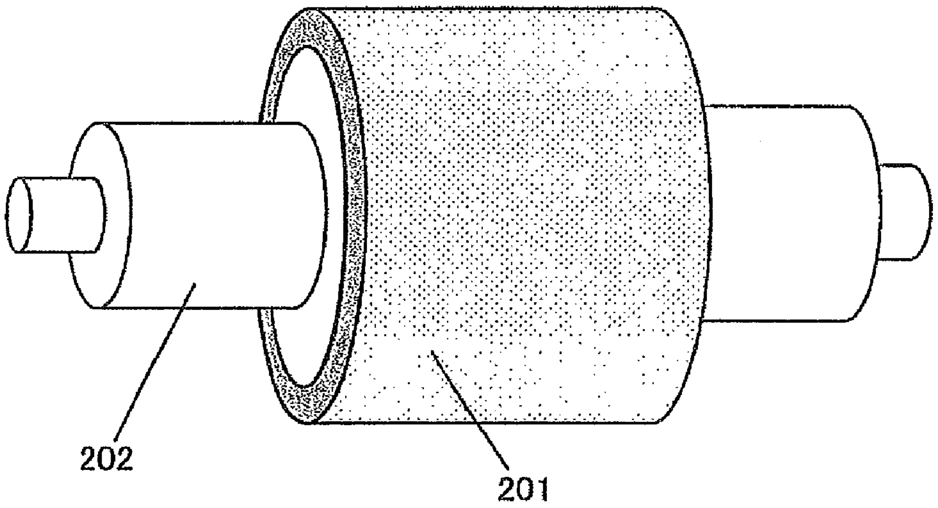
FIG. 8 is a view illustrating a rotor using a magnet including a fluoride compound.

An example of production of a rotor for a motor is shown below. In FIG. 8, the schematic view of the produced rotor is shown. For an inner rotor, a magnet was arranged to the periphery of a shaft 202, thereby, a magnet 201 including the above fluoride was arranged to the periphery of a shaft 202. The thermal demagnetization of the rotor in FIG. 8 was hardly done, thereby, by applying a hard magnetic material with small temperature dependence of coercive force, it is possible to obtain an output which has resistance against an inverse magnetic field, small temperature dependence of its induced voltage, and high temperature stability.

EXAMPLE 6

Powder having a main phase of $Nd_2Fe_{14}B$ and particle size of 1 to 100 μm was used as a magnetic material, and a film based of crystalline or amorphous $NdF_3$-based film was formed on a portion or whole of the surface of the magnetic powder using a solution containing $NdF_3$. The $NdF_3$ thickness was 1 to 100 nm on average. Even if $NdF_2$ was mixed into $NdF_3$, the magnetic properties of the magnetic powder were not affected. An oxide containing an rare earth element and a small amount of impurity, i.e. carbon-containing compound, may exist adjacent to the interface between these fluoride layers and the magnetic powder. Fluorides that may be used as similar solution are $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, or $PmF_3$. By forming at least one kind of these crystalline or amorphous component containing fluoride compound on the surface of the powder of which main phase being $Nd_2Fe_{14}B$, any effect of decrease of the temperature coefficient of the coercive force, increase the coercive force, decrease of the temperature coefficient or increase of Hk of the residual magnetic flux density, and increase the squareness property of the demagnetization curve was obtained. By producing a compound that is a mixture of magnetic powder in which the above fluorides being formed and organic resin such as PPS (polyphenylene sulfide) and molding it in a magnetic field, it may be molded into a bonded magnet. The magnetic properties of the produced bonded magnet are shown in Table 1.

TABLE 1

| bonded magnet | | | | | | |
|---|---|---|---|---|---|---|
| fluoride | average film thickness of fluoride (nm) | coercive force (kOe) | residual magnetic flux density (T) | energy product (MGOe) | temperature coefficient of coercive force (%/° C.) | temperature coefficient of residual magnetic flux density (%/° C.) |
| $BaF_2$ | 10 | 15.0 | 1.00 | 19.5 | −0.41 | −0.09 |
| $CaF_2$ | 10 | 15.0 | 1.01 | 19.6 | −0.41 | −0.09 |
| $MgF_2$ | 10 | 15.0 | 1.01 | 19.5 | −0.41 | −0.09 |
| $SrF_2$ | 10 | 15.0 | 1.01 | 19.5 | −0.41 | −0.09 |
| LiF | 10 | 15.0 | 1.01 | 19.5 | −0.41 | −0.09 |
| $LaF_3$ | 10 | 15.0 | 1.01 | 19.6 | −0.41 | −0.09 |
| $NdF_3$ | 10 | 16.0 | 1.03 | 19.8 | −0.39 | −0.08 |
| $PrF_3$ | 10 | 22.0 | 1.02 | 19.7 | −0.37 | −0.09 |
| $SmF_3$ | 10 | 17.0 | 1.02 | 19.4 | −0.39 | −0.08 |
| $EuF_3$ | 10 | 16.0 | 1.01 | 19.5 | −0.40 | −0.09 |
| $GdF_3$ | 10 | 16.0 | 1.02 | 19.5 | −0.40 | −0.09 |
| $TbF_3$ | 10 | 32.0 | 1.01 | 20.1 | −0.35 | −0.08 |
| $DyF_3$ | 10 | 25.0 | 1.01 | 20.0 | −0.34 | −0.08 |
| $CeF_3$ | 10 | 16.0 | 1.00 | 19.3 | −0.40 | −0.09 |
| $HoF_3$ | 10 | 17.0 | 1.02 | 19.4 | −0.40 | −0.09 |
| $ErF_3$ | 10 | 15.5 | 1.02 | 19.4 | −0.40 | −0.09 |
| $TmF_3$ | 10 | 15.5 | 1.00 | 19.4 | −0.41 | −0.09 |
| $YbF_3$ | 10 | 16.0 | 1.00 | 19.2 | −0.41 | −0.09 |

EXAMPLE 7

Magnetic powder having a main phase of $Nd_2Fe_{14}B$ and particle size of 1 to 100 μm was used, and a crystalline or amorphous fluoride-based film was formed on a portion or whole of the surface of the magnetic powder using a solution containing fluoride. The fluoride thickness was 1 to 100 nm on average. The magnetic powder was heated to 1100° C. and further annealed at 500 to 600° C. to increase the coercive force of the magnetic powder. Coercive force of 10 kOe or more was obtained by the annealing. A rare earth rich phase was formed adjacent to the surface of the magnetic powder by the above annealing, and at its outer side there was a crystalline or amorphous fluoride-based film. As for fluorides, $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, or $PmF_3$ might be formed, and by forming these fluoride, any effect of decrease of the temperature coefficient of the coercive force, increase the coercive force, and decrease of the temperature coefficient or increase of Hk of the residual magnetic flux density was obtained. Oxide on the surface of the magnetic powder and a portion of fluoride reacted to mix oxygen into the fluoride by the above annealing, and oxygen-containing fluoride was formed. Formation of the oxyfluoride may decrease the oxygen concentration of the main phase, thereby providing in the increase of residual magnetic flux density and increase of squareness property. The powder may be used as highly heat resistance magnetic powder for bonded magnet because the oxidation of the surface of the magnetic powder may be suppressed by fluoride even without surface oxide. The magnetic properties of the produced bonded magnet are shown in Table 2.

TABLE 2

| bonded magnet | | | | | | |
|---|---|---|---|---|---|---|
| fluoride | average film thickness of fluoride (nm) | coercive force (kOe) | residual magnetic flux density (T) | energy product (MGOe) | temperature coefficient of coercive force (%/° C.) | temperature coefficient of residual magnetic flux density (%/° C.) |
| $BaF_2$ | 50 | 25.0 | 1.05 | 27 | −0.39 | −0.09 |
| $CaF_2$ | 100 | 25.0 | 1.04 | 27.1 | −0.39 | −0.09 |
| $MgF_2$ | 100 | 25.0 | 1.04 | 27.1 | −0.38 | −0.09 |
| $SrF_2$ | 100 | 25.0 | 1.03 | 26.7 | −0.37 | −0.09 |
| LiF | 100 | 25.0 | 1.02 | 26.6 | −0.38 | −0.09 |
| $LaF_3$ | 100 | 25.0 | 1.02 | 26.8 | −0.39 | −0.09 |
| $NdF_3$ | 100 | 27.0 | 1.07 | 27.8 | −0.32 | −0.09 |
| $PrF_3$ | 100 | 29.0 | 1.06 | 27.1 | −0.38 | −0.09 |
| $SmF_3$ | 100 | 25.0 | 1.05 | 27.5 | −0.39 | −0.09 |
| $EuF_3$ | 100 | 26.0 | 1.05 | 27 | −0.39 | −0.09 |
| $GdF_3$ | 100 | 26.0 | 1.05 | 27.8 | −0.38 | −0.09 |
| $TbF_3$ | 100 | 40.0 | 1.04 | 29.5 | −0.31 | −0.08 |
| $DyF_3$ | 100 | 35.0 | 1.05 | 28.5 | −0.3 | −0.08 |
| $CeF_3$ | 100 | 25.1 | 1.02 | 26.4 | −0.38 | −0.09 |
| $HoF_3$ | 100 | 25.0 | 1.01 | 26.3 | −0.39 | −0.09 |
| $ErF_3$ | 100 | 25.2 | 1.02 | 26.4 | −0.39 | −0.09 |
| $TmF_3$ | 100 | 25.0 | 1.01 | 26.4 | −0.39 | −0.09 |
| $YbF_3$ | 100 | 25.2 | 1.02 | 26.4 | −0.39 | −0.09 |

EXAMPLE 8

Magnetic powder having a main phase of $Nd_2Fe_{14}B$ and particle size of 1 to 100 μm was used, and a crystalline or amorphous fluoride-based film was formed on a portion or whole of the surface of the magnetic powder using a solution containing fluoride. The fluoride thickness was 1 to 100 nm on average. If the crystalline or amorphous fluoride-based film would be formed or not could be identified by analysis such as X-ray diffraction, SEM composition analysis, and TEM. The magnetic powder coated with the crystalline or amorphous fluoride-based film was applied a magnetic field, and a compact was made using a pressing machine. The compact was heated to 900 to 1100° C. and further annealed at 500 to 700° C. to increase the coercive force of the body. Coercive force of 10 kOe or more was obtained by the annealing. If the thickness of the crystalline or amorphous fluoride-based film would be thin, in the above heat treating of 1100° C., the body was sintered by the partial aggregation or breaking of the fluoride layer. By the above heat treating, a rare earth rich phase was formed adjacent to the surface of the magnetic powder, and at its outer side there was a crystalline or amorphous fluoride-based layer. As for fluorides, $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, or $PmF_3$ might be formed, and these fluorides would either form an interface between itself and the rare earth rich phase or the rare earth oxide, or become a mixed layer of the rare earth oxide and itself. Formation of the mixed layer of the rare earth oxide and the fluoride results in forming a fluoride with low fluorine concentration, however, similar effect might be obtained. By forming such a fluorine-containing periphery layer, it was possible to prevent the inside from being oxidized, thereby any effect of decrease of the temperature coefficient of the coercive force, increase the coercive force, and decrease of the temperature coefficient or increase of Hk of the residual magnetic flux density was obtained. The magnetic properties of the produced bonded magnet are shown in Table 3.

TABLE 3

| bonded magnet | | | | | | |
|---|---|---|---|---|---|---|
| fluoride | average film thickness of fluoride (nm) | coercive force (kOe) | residual magnetic flux density (T) | energy product (MGOe) | temperature coefficient of coercive force (%/° C.) | temperature coefficient of residual magnetic flux density (%/° C.) |
| $BaF_2$ | 50 | 30.0 | 1.2 | 32 | −0.39 | −0.09 |
| $CaF_2$ | 50 | 31.0 | 1.21 | 32.1 | −0.38 | −0.09 |
| $MgF_2$ | 50 | 31.0 | 1.22 | 32.2 | −0.39 | −0.09 |
| $SrF_2$ | 50 | 31.0 | 1.2 | 32.1 | −0.38 | −0.09 |
| LiF | 50 | 31.0 | 1.2 | 32.1 | −0.39 | −0.09 |
| $LaF_3$ | 50 | 30.0 | 1.2 | 32.1 | −0.39 | −0.09 |
| $NdF_3$ | 50 | 31.0 | 1.25 | 33.5 | −0.34 | −0.08 |
| $PrF_3$ | 50 | 33.0 | 1.22 | 32.5 | −0.35 | −0.09 |
| $SmF_3$ | 50 | 30.0 | 1.23 | 32.8 | −0.37 | −0.09 |
| $EuF_3$ | 50 | 30.0 | 1.21 | 32.3 | −0.38 | −0.09 |
| $GdF_3$ | 50 | 31.0 | 1.21 | 32.2 | −0.36 | −0.09 |
| $TbF_3$ | 50 | 38.0 | 1.22 | 32.5 | −0.34 | −0.08 |
| $DyF_3$ | 50 | 35.0 | 1.22 | 32.4 | −0.33 | −0.07 |
| $CeF_3$ | 50 | 30.0 | 1.2 | 31.5 | −0.39 | −0.09 |
| $HoF_3$ | 50 | 30.2 | 1.2 | 31.8 | −0.39 | −0.09 |
| $ErF_3$ | 50 | 30.1 | 1.2 | 31.8 | −0.38 | −0.09 |
| $TmF_3$ | 50 | 30.2 | 1.19 | 31.5 | −0.39 | −0.09 |
| $YbF_3$ | 50 | 30.3 | 1.18 | 31.4 | −0.39 | −0.09 |

EXAMPLE 9

Magnetic powder having a main phase of $Nd_2Fe_{14}B$ and particle size of 1 to 100 μm was used, and a crystalline or amorphous fluoride-based film was formed on a portion or whole of the surface of the magnetic powder using a solution containing fluoride. The thickness of the fluoride was 1 to 100 nm on average. If the crystalline or amorphous fluoride-based film would be formed or not, could be identified by analysis such as X-ray diffraction, SEM composition analysis, and TEM. The magnetic powder coated with the crystalline or amorphous fluoride-based film was applied a magnetic field, and a compact was made using a pressing machine. The compact was heated to 1000° C. or more and further annealed at 500 to 600° C. to increase the coercive force of the body. Coercive force of 10 kOe or more was obtained by the annealing. The crystalline or amorphous fluoride-based layer remained present on the periphery of the magnetic powder in a continuous layer after the above heat treating. By the above heat treating, a rare earth rich phase was formed adjacent to the surface of the magnetic powder, and at its outer side there was the crystalline or amorphous fluoride-based layer. As for fluorides, $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, or $PmF_3$ might be formed, and these fluorides would either form an interface between itself and the rare earth rich phase or the rare earth oxide, or become a mixed layer of the rare earth oxide and itself. Formation of the mixed layer of the rare earth oxide and the fluoride resulted in forming a fluoride with low fluorine concentration, however, similar effect might be obtained. By forming such a fluorine-containing periphery layer, it was possible to prevent the inside from being oxidized, thereby any effect of decrease of the temperature coefficient of the coercive force, increase the coercive force, and decrease of the temperature coefficient or increase of Hk of the residual magnetic flux density was obtained. By pressurizing the above magnetic powder during the heat treating of 500 to 600° C., a sintered body was made. The magnetic properties of the produced sintered body are shown in Table 4.

TABLE 4

| sintered magnet | | | | | | |
|---|---|---|---|---|---|---|
| fluoride | average film thickness of fluoride (nm) | coercive force (kOe) | residual magnetic flux density (T) | energy product (MGOe) | temperature coefficient of coercive force (%/° C.) | temperature coefficient of residual magnetic flux density (%/° C.) |
| $BaF_2$ | 100 | 30.0 | 1.14 | 28 | −0.41 | −0.09 |
| $CaF_2$ | 100 | 31.0 | 1.13 | 27.5 | −0.4 | −0.09 |
| $MgF_2$ | 100 | 31.0 | 1.13 | 27.4 | −0.42 | −0.09 |
| $SrF_2$ | 100 | 31.0 | 1.12 | 26.8 | −0.39 | −0.09 |
| LiF | 100 | 31.0 | 1.11 | 26.5 | −0.38 | −0.09 |
| $LaF_3$ | 100 | 31.0 | 1.12 | 26.8 | −0.39 | −0.09 |
| $NdF_3$ | 100 | 32.0 | 1.16 | 28.5 | −0.35 | −0.07 |
| $PrF_3$ | 100 | 32.0 | 1.15 | 28.3 | −0.37 | −0.08 |
| $SmF_3$ | 100 | 31.0 | 1.11 | 28.1 | −0.39 | −0.08 |
| $EuF_3$ | 100 | 31.0 | 1.12 | 27.6 | −0.39 | −0.08 |
| $GdF_3$ | 100 | 33.0 | 1.12 | 27.5 | −0.38 | −0.08 |
| $TbF_3$ | 100 | 39.0 | 1.14 | 28.9 | −0.31 | −0.08 |
| $DyF_3$ | 100 | 36.0 | 1.15 | 28.8 | −0.29 | −0.07 |
| $CeF_3$ | 100 | 30.0 | 1.13 | 27.4 | −0.4 | −0.09 |
| $HoF_3$ | 100 | 30.1 | 1.12 | 27 | −0.41 | −0.09 |
| $ErF_3$ | 100 | 30.0 | 1.12 | 27.1 | −0.41 | −0.09 |
| $TmF_3$ | 100 | 30.1 | 1.11 | 26.8 | −0.41 | −0.09 |
| $YbF_3$ | 100 | 30.2 | 1.12 | 26.9 | −0.41 | −0.09 |

EXAMPLE 10

It is possible to form a crystalline or amorphous fluoride-based film on a 2-17 phase (SmFeN-based, SmCo-based) that is another main phase other than 2-14 phase. By immersing $Sm_2Fe_{17}N_3$ powder of particle size of 1 to 10 μm into a solution containing fluoride, the crystalline or amorphous fluoride-based film was formed on a portion or whole of the surface of the powder. The solvent on the surface of the magnetic powder can be removed by heating the powder at a temperature of 100° C. or more, thereby the crystalline or amorphous fluoride-based film was formed on a portion or whole of the surface of the magnetic powder. The thickness of the fluoride was 1 to 100 nm. As for fluorides, $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, or $PmF_3$ might be formed. It is possible for the SmFeN or SmCo magnetic powder coated with these fluorides on a portion or whole of its surface of itself to be made a bonded magnet by mixing with a resin and by injection molding or compression molding.

EXAMPLE 11

Magnetic powder having a main phase of $Nd_2Fe_{14}B$ and particle size of 1 to 100 μm was used, and a crystalline or amorphous $NdF_3$-based film was formed on a portion or whole of the surface of the magnetic powder using a gelled $NdF_3$ by the use of a solvent. During application to the magnetic powder, solvent that hardly damages the magnetic powder magnetically or structurally should be selected to be used. The $NdF_3$ thickness formed by application was 1 to 10000 nm on average. Even if $NdF_2$ was mixed into $NdF_3$, the magnetic properties of the magnetic powder were not affected. Oxide containing rare earth element, and a small amount of impurity, i.e. carbon or oxygen-containing compound, might exist adjacent to the interface between these fluoride layers and the magnetic powder. Fluorides that might be used as similar gel material were $BaF_2$, $CaF_2$, $MgF_2$, $SrF_2$, LiF, $LaF_3$, $NdF_3$, $PrF_3$, $SmF_3$, $EuF_3$, $GdF_D$ $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, AgF, $PbF_4$, $AlF_3$, $GaF_3$, $SnF_2$, $SnF_4$, $InF_3$, $PbF_2$, or $BiF_3$. By forming at least one kind of these crystalline or equivalent composition amorphous component containing fluoride compound on the surface of the powder of which main phase being $Nd_2Fe_{14}B$, any effect of decrease of the temperature coefficient of the coercive force, increase the coercive force, decrease of the temperature coefficient or increase of Hk of the residual magnetic flux density, increase the squareness property of the demagnetization curve, increase of corrosion resistance, and suppression of oxidation was obtained. These fluoride might be either ferromagnetic or paramagnetic at 20° C. The coverage of fluoride over the surface of the magnetic powder could be enhanced by applying the fluoride on the magnetic powder using gel than the case by mixing fluoride powder without using gel. Accordingly, the above effect appears more prominently in the case of the coating using gel than that of mixing with fluoride powder. Even if oxygen or constituent element of the main phase would be contained in the fluoride, the above effect would be sustained. It was possible for a bonded magnet to be molded by making a compound that is a mixture of the magnetic powder, on which the above fluoride being formed, and a simple body of polyphenylether or polyphenylenesulfide, or an organic resin such as epoxy resin, polyimide resin, polyamide resin, polyamide-imide resin, Kerimid resin, and maleimide resin, and molding it in a magnetic field or without the magnetic field. In the bonded magnet using $Nd_2Fe_{14}B$ powder applied by the above gel, similar to the effect for magnetic powder, any effect of decrease of the temperature coefficient of the coercive force, increase the coercive force, decrease of the temperature coefficient or increase of Hk of the residual magnetic flux density, increase of the squareness property of demagnetization curve, increase of corrosion resistance, and suppression of oxidation could be identified. These effects can be considered as the result of stabilizing the structure of the magnetic domain due to formation of a fluoride layer, increase of anisotropy of the magnet adjacent to fluoride, and the fact that fluoride prevents the magnetic powder from being oxidized.

EXAMPLE 12

Magnetic powder having a main phase of $Nd_2Fe_{14}B$, $Sm_2Fe_{17}N_3$, or $Sm_2Co_{17}$ and particle size of 1 to 100 μm was used, and a crystalline or amorphous $REF_3$-based film was formed on a portion or whole of the surface of the magnetic powder using a colloidal liquid or a solution containing a gel material containing $REF_3$ (RE; rare earth element). The $REF_3$ thickness was 1 to 1000 nm on average. Even if $REF_2$ was mixed into $REF_3$, the magnetic properties of the magnetic powder were not affected. After the formation, the solvent used for forming the gel material was removed. Oxide containing rare earth element, and a small amount of impurity, i.e. carbon or oxygen-containing compound, or a rare earth rich phase might exist adjacent to the interface between the fluoride compound layer and the magnetic powder. The composition of the fluoride could be changed by controlling the composition of the colloidal liquid or the solution containing the gel or the condition of application within the range of REFx (X=1 to 3). By forming at least one kind of these crystalline or equivalent composition amorphous component containing fluoride compound on the surface, any effect of decrease of the temperature coefficient of the coercive force, increase the coercive force, decrease of the temperature coefficient or increase of Hk of the residual magnetic flux density, increase the squareness property of the demagnetization curve, increase of corrosion resistance, and suppression of oxidation was obtained. It was possible for a bonded magnet to be molded by making a compound that is a mixture of the magnetic powder, on which the above fluoride being formed, and a simple body of polyphenylether or polyphenylene sulfide, or organic resin such as epoxy resin, polyimide resin, polyamide resin, polyamide-imide resin, Kerimid resin, and maleimide resin, and molding it by compression molding or injection molding. Alternatively, a molded magnet having volume percentage of the magnetic powder of 80% to 99%, could be made by performing compression molding, thermal compression molding, or extruding of the magnetic powder in which above fluoride layer was formed, using a mold. Layered fluoride was formed in the grain boundary of the molded magnet. In a bonded magnet using powder of $Nd_2Fe_{14}B$, $Sm_2Fe_{17}N_3$, or $Sm_2Co_{17}$ applied with the above gel, similar to the effect of magnetic powder, any effect of decrease of the temperature coefficient of the coercive force, increase the coercive force, decrease of the temperature coefficient or increase of Hk of the residual magnetic flux density, increase the squareness property of the demagnetization curve, increase of corrosion resistance, and suppression of oxidation may be identified. Though each of the powder of $Nd_2Fe_{14}B$, $Sm_2Fe_{17}N_3$, or $Sm_2Co_{17}$ is added by various elements in application, even if any additive element would be used, fluoride might be formed and the above effect could be identified. The texture, the crystal structure, the grain boundary, and the particle size of the magnetic powder of $Nd_2Fe_{14}B$, $Sm_2Fe_{17}N_3$, or $Sm_2Co_{17}$ were also controlled by adding metal based elements including rare earth elements. Thereby, beside of the main phase, other phases were formed by adding elements or by the manufacturing process of the magnet. As for NdFeB based powder, fluorides, a rare earth rich phase, or a Fe rich phase might be used, the surface of the powder in which these oxides were formed with such phases, was also possible to be applied by the above gel material, thereby resulting in the formation of layered fluorides. The magnetic properties of metal based magnetic powder containing at least one rare earth elements changed, because rare earth elements tended to be easily oxidized. Since fluoride is effective as a layer to prevent rare earth element from being oxidized, the fluoride layer used in the above example may be expected for all magnetic powders based of metal including rare earth element to have an effect to protect them from being oxidized, thereby being effective in suppression of corrosion and collapse, and stability of corrosion-potential.

Industrial Applicability

The present invention is especially available to a magnet motor as a magnet for use in a high temperature of 100° C. or more, because the coercive force can be enhanced while suppressing the energy product of R—Fe—B (R; rare earth element) based magnet from being decreased. Such a magnet motor includes, for example, a driving motor of a hybrid vehicle, a starter motor, and an electrically controlled power steering motor.

It should be further understood by those skilled in the art that although the foregoing description has been made on embodiments of the invention, the invention is not limited thereto and various changes and modifications may be made without departing from the spirit of the invention and the scope of the appended claims.

Advantages of the Invention

As described above, the present invention enables to achieve a good balance between high coercive force and high residual magnetic flux density by forming a fluoride compound into a layered form at a grain boundary of NdFeB. The present invention may also provide a rare earth magnet available in a temperature range from 100° C. to 250° C., it may be applied for a rotor of a magnet motor.

The invention claimed is:

1. A rare-earth magnet comprising:

R—Fe—B (R; rare-earth element) based magnetic powder;

a rare earth rich phase formed at an outer side of the magnetic powder; and a fluorine-containing layer formed at an outer side of the rare earth rich phase, the rare-earth magnet including a rare earth oxide, and wherein an interface is formed between the rare earth oxide and the fluorine-containing layer, the fluorine-containing layer having a thickness of 1 to 100 nm on average.

2. The rare-earth magnet according to claim 1, wherein the fluorine-containing layer contains, as a main component, $BaF_2$, $CaF_2$, $MgF_2$, $SrF_2$, LiF, $LaF_3$, $NdF_3$, $PrF_3$, $SmF_3$, $EuF_3$, $GdF_3$, $TbF_3$, $DyF_3$, $CeF_3$, $HoF_3$, $ErF_3$, $TmF_3$, $YbF_3$, $LuF_3$, $LaF_2$, $NdF_2$, $PrF_2$, $SmF_2$, $EuF_2$, $GdF_2$, $TbF_2$, $DyF_2$, $CeF_2$, $HoF_2$, $ErF_2$, $TmF_2$, $YbF_2$, $LuF_2$, $YF_3$, $ScF_3$, $CrF_3$, $MnF_2$, $MnF_3$, $FeF_2$, $FeF_3$, $CoF_2$, $CoF_3$, $NiF_2$, $ZnF_2$, AgF, $PbF_4$, $A1F_3$, $GaF_3$, $SnF_2$, $SnF_4$, $InF_3$, $PbF_2$, or $BiF_3$.

3. The rare-earth magnet according to claim 1, wherein the fluorine-containing layer contains oxygen.

4. The rare-earth magnet according to claim 1, wherein $Nd_2Fe_{14}B$ is a main phase of the magnetic powder.

5. The rare-earth magnet according to claim 1, wherein the fluorine-containing layer exhibits ferromagnetism.

6. The rare-earth magnet according to claim 1, which is produced by: forming a fluorine compound (fluoride) on a portion or whole of a surface of the magnetic powder by using a solution containing fluorine; and then heating at 1000° C. or more.

* * * * *